June 18, 1929.  W. STEINMANN  1,717,419

METHOD OF DRAWING METAL

Filed May 9, 1924

Inventor:
Walter Steinmann
by /s/ Gales G. Munn
his Attorney.

Patented June 18, 1929.

1,717,419

UNITED STATES PATENT OFFICE.

WALTER STEINMANN, OF NEWARK, NEW JERSEY, ASSIGNOR TO GENERAL MOTORS CORPORATION, OF DETROIT, MICHIGAN, A CORPORATION OF DELAWARE.

METHOD OF DRAWING METAL.

Application filed May 9, 1924. Serial No. 712,006.

This invention relates to metal drawing and is herein illustrated by reference to a method of forming race rings or sleeves for roller bearings.

Cylindrical sleeves or race rings have heretofore been made by forging a cup from bar stock and cutting off the ends of the cup. They have also been made from steel tubing by cutting off sections of the proper length, heat treating and machining to size. Tube steel has severe internal strains which cause distortion when the steel is heat treated and this out-of-roundness necessitates excessive machining or grinding of a hardened surface. Tube steel is also more expensive than flat stock. An object of the invention, therefore, is to provide a method of economically forming race rings from flat stock. As illustrated, a washer-shaped piece is cut from flat stock and hot drawn into the form of a hollow frustum of a cone and then the frustum is ironed down to make a hollow cylindrical sleeve of the desired size.

To these ends and also to improve generally upon methods and devices of the character indicated, my invention consists in the various matters hereinafter described and claimed.

Referring to the drawings, Figures 1, 2, 3 and 4 are sections showing the work piece in the various stages of formation.

Figure 1:
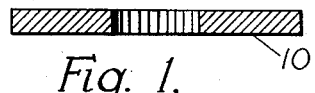
Figure 2:
Figure 3:
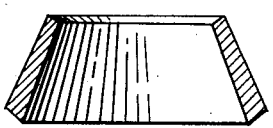
Figure 4:
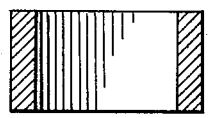
Figure 5:
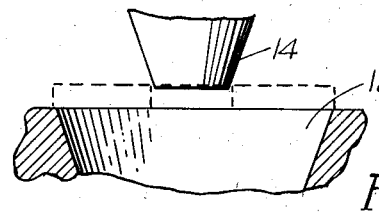
Figures 5 and 6 are sections through a die indicating, respectively, the beginning and the end of the first drawing operation.
Figure 6:
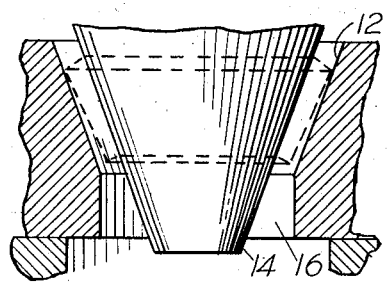
Figure 7:
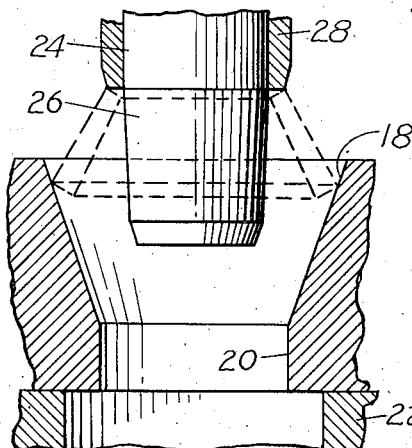
Figures 7 and 8 are sections of a die showing, respectively, the beginning and the end of the final drawing operation.
Figure 8:
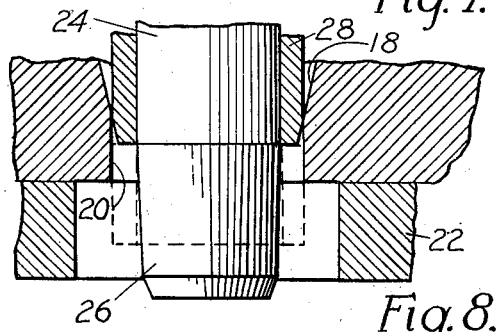

The numeral 10 indicates a perforated disc or washer-shaped work-piece which is cut out from a piece of flat stock in any suitable way, as by means of compound blanking dies. This disc is heated to approximately 1600° F. and supported at the larger end of a conical die surface 12, the diameter of the conical surface at its larger end being approximately equal to, or a little smaller than, the outside diameter of the work-piece. A frusto conical tool or mandrel 14 is then moved at right angles to the face of the disc in line with the axis, the smaller end of the tool being of a diameter preferably a little smaller than the diameter of the opening in the disc. A taper of 45°, included angle, is found to be suitable for the die surface and the tool. The die and the tool are uniformly tapered. The movement of the tool 14 causes the middle portions of the disc to expand and draws the disc into the form of a hollow frustum of a cone, the larger end of the disc contracting somewhat as the metal is forced down the conical surface 12. An opening 16 through the bottom of the die allows the end of the tool to project and one end of the frustum is left thicker than the other due to the fact that there is more material at the outside of the disc. The variation in thickness is uniform from end to end because the portions of the disc nearer the center are drawn out of their original positions to a greater extent.

The frusto conical work-piece is then reheated to approximately 1600° F. and is placed in inverted position against a steep conical die surface 18 which diverges upwardly from an opening 20, the latter being of a diameter equal to the outside diameter of the finished sleeve. The die is supported over an apertured bolster plate 22. A reciprocating tool or mandrel 24 is next moved in line with the axis of the work-piece. This tool is substantially cylindrical although the end portion 26 preferably has a very slight taper in order that the work-piece may be more easily stripped after the drawing operation. The diameter of the tool is substantially equal to the inside diameter of the finished sleeve. A reciprocating collar and stripper 28 is slidably mounted relatively to the tool 24 and is arranged to move downwardly with the tool against the small end of the frustum thereby forcing the latter to contract as the wider end rides down the steep conical die surface 18. A taper of 30°, included angle, is found to be suitable for the die surface 18 when the frustum has the taper shown. The continued descent of the collar and tool forces the cylindrical work piece through the opening 20 at the bottom of the die and the subsequent withdrawal of the tool, while the collar or stripper 28 is temporarily held stationary, easily strips the work piece. The outside diameter of the finished sleeve is approximately equal to the mean of the inside diameter and the outside diameter of the perforated disc 10 and there is no waste of material. Subsequent heat-treatment indicates that there is little internal strain in the steel because there is very little out-of roundness.

Although the invention has been described by reference to certain steps and to specific apparatus, it should be understood that, in its broader aspects, the invention is not necessarily limited thereto.

I claim:

The method of forming a cylindrical sleeve from a perforated disc, which consists in heating the disc, causing relative movement of approach between a uniformly tapered tool and a similarly tapered die to draw the disc into the form of a hollow frustum of a cone having one end thicker than the other with a uniform variation in thickness between the ends, reheating the piece, supporting it with its larger and thicker end against a steep conical face, and causing relative movement between the piece and the conical face to contract the piece into a cylindrical sleeve of approximately the diameter of the smaller end; substantially as described.

In testimony whereof I hereunto affix my signature.

WALTER STEINMANN.